Dec. 27, 1966  C. L. HAGEDORN  3,294,358
PIPE SLEEVE
Original Filed Sept. 5, 1963

INVENTOR.
CHARLES L. HAGEDORN

BY Douglas S. Johnson

Attorney

United States Patent Office 3,294,358
Patented Dec. 27, 1966

3,294,358
PIPE SLEEVE
Charles L. Hagedorn, 23 Burbank Drive,
Willowdale, Ontario, Canada
Continuation of application Ser. No. 306,831, Sept. 5, 1963. This application Mar. 4, 1966, Ser. No. 534,566
1 Claim. (Cl. 249—175)

This application is a continuation of my application Serial No. 306,831, filed September 5, 1963, now abandoned.

This invention relates to pipe sleeves. It has been common building practice to provide in floors or walls a sleeve about which the floor or wall is built. The sleeve is then removed to leave a hole through which pipes or ducting may be led. These sleeves have taken various forms: the most common being a flexible tube of metal with a terminal flange. These sleeves are usually fabricated on the site and are consequently relatively expensive; another type employs a flexible plastic tube of the same form as the prior metal structure, i.e. a uniform bore with a terminal flange at one end. The flexible characteristics of these structures necessitates the provision of a filler to maintain the sleeve in its original form. In the absence of a filler the sleeve would collapse. Metal sleeves are awkward and costly. The plastic sleeves apart from being flexible and requiring a filler, must be provided in a wide range of sizes of various radii and lengths according to the depth of the floor or wall. This is costly, the variety of sizes requires a larger inventory than necessary with a reduced number of sizes or a single size.

It is, therefore, the main object of this invention to provide an improved pipe sleeve.

It is another object of this invention to provide an improved pipe sleeve which is inexpensive to produce and use and which may be repeatedly reused.

It is another object of this present invention to provide a pipe sleeve which may be supplied in a reduced number of sizes.

To accomplish the various objects in this present invention, the inventor provides a pipe sleeve comprising a tubular member having a first and second end, said member having a first internal diameter adjacent said first end and a second reduced external diameter adjacent said second end, corresponding to the internal diameter of said first end whereby the first end of a second sleeve may be engaged with the second end of a first sleeve.

Such a structure enables a plurality of pipe sleeves to be secured one to the other and a sleeve of any desired length may thus be provided.

These and various other objects and features will become evident from the following description made with reference to the accompanying drawings and in which.

Figure 1:
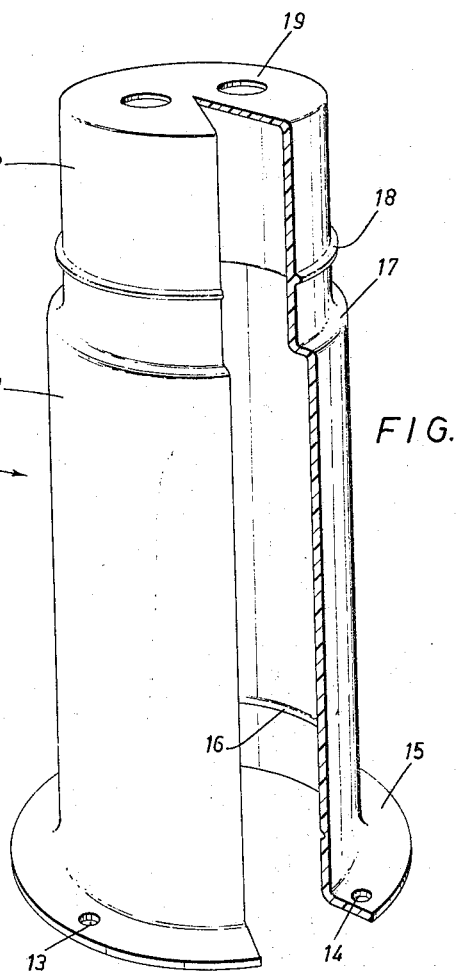
FIGURE 1 is a partial fragmentary perspective view of a preferred embodiment of the invention.

Referring now to the drawings in FIGURE 1, a partial fragmentary perspective view of the invention is illustrated. The sleeve is generally indicated at 10 and comprises a lower tubular portion 11 and an upper tubular portion 12. It will be understood that these terms are relative and these portions may be upper and lower respectively.

Tubular portion 11 has substantially uniform internal and external diameters throughout its length. Adjacent the lower end of tubular portion 11 a peripheral flange 15 is provided and in this flange is a series of nailing holes such as 13 and 14. Adjacent the lower end of tubular portion 11, on the inner wall thereof, a peripheral channel or depression 16 is provided. In this embodiment, channel 16 extends circumferentially about the inner wall of tubular portion 11. It will be understood that channel 16 may comprise two or more separate arcuate depressions extending about the inner wall.

Figure 2:
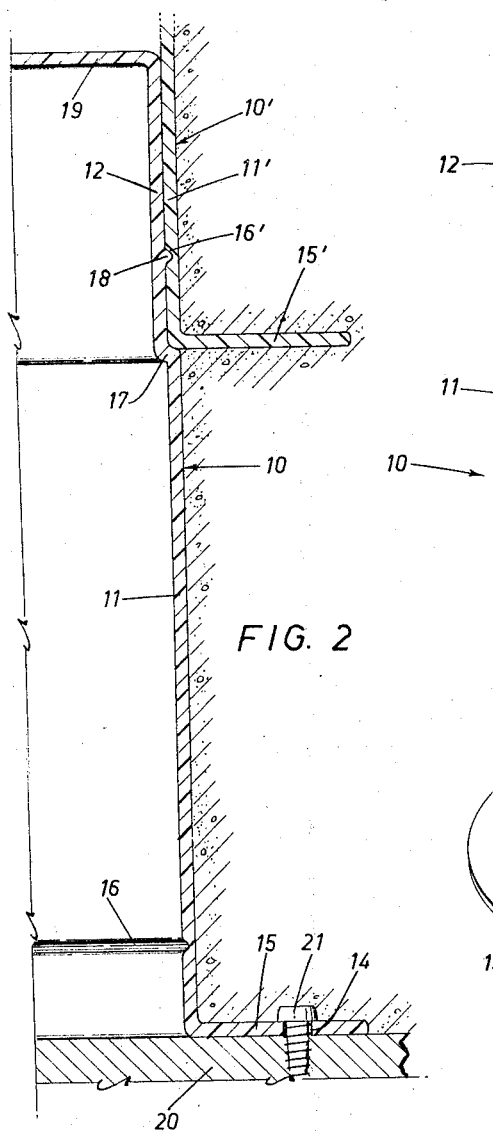
FIGURE 2 is a partial vertical section taken through a section of a floor with a pair of pipe sleeves assembled in a telescoped relationship in accordance with the present invention.

At the remote end of tubular portion 11 from flange 15, the upper tubular portion 12 is formed integrally therewith and joined thereto by means of a step 17. Tubular portion 12 has reduced diameters with respect to tubular portion 11 and the external diameter of tubular portion 12 corresponds substantially to the internal diameter of tubular portion 11. About the exterior wall of tubular portion 12, a peripheral ridge or projection 18 extends circumferentially. Ridge 18 is spaced apart from step 17, a distance substantially equal to the distance between the peripheral depression 16 in tubular portion 11 and the lower end of tubular portion 11. As will be evident from the drawing, each of these several portions 11 and 12, cap 19 and peripheral flange 15 are formed integrally from a synthetic plastic material such as linear polyethylene or its equivalent. The integral formation is less expensive than the provision of a separate cap although it will be understood that a separate cap may be provided if desired. It will also be noted that cap 19 is provided with a pair of holes therein to permit the junction of a pair of sleeves as illustrated in FIGURE 2. This pair of holes may of course, be a single hole. When a separate cap is employed, holes may or may not be provided therein as desired.

FIGURE 2 is a vertical section through a floor with a pair of pipe sleeves 10 and 10' therein mounted in a nesting relationship to provide a pipe sleeve of increased length. Again, the numeral 11 depicts the lower tubular portion of pipe sleeve 10 and 12 at the upper tubular portion which are joined together at step 17.

In this application, pipe sleeve 10 has been secured to a form 20 by means of nails such as 21. Since the depth or height of the wall to be formed exceeds the standard length or height of pipe sleeve 10, a second sleeve 10' has been mounted thereover, the lower tubular portion 11 of sleeve 10' is indicated at 11'. As will be evident from the drawing, sleeve 10' is mounted over sleeve 10 so that flange 15' rests upon ledge or step 17 of sleeve 10 and depression 16' is engaged by the peripheral projection 18 on tubular portion 12. In this manner, sleeve 11' is held securely to sleeve 11 and the upper end of sleeve 10' may be cut off so that it is flush with the final floor level or wall level.

Figure 3:
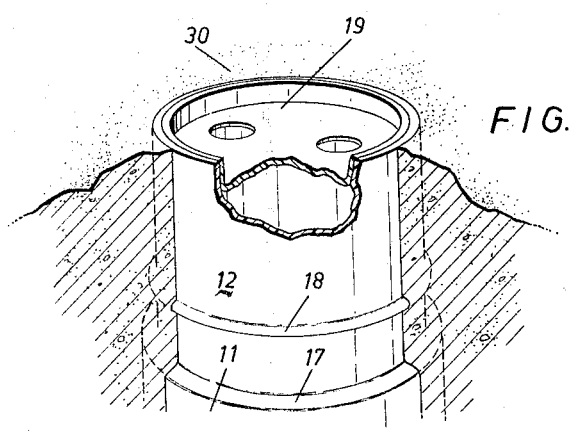
FIGURE 3 is an enlarged partial fragmentary perspective view of one end of a pipe sleeve in a floor in accordance with the invention and embodies an alternate mode of fitting a cap.

Cap 19 of these sleeves may either be removed before or after the formation of the wall. However, it is imperative that as the wall is built, that no great amount of foreign matter or debris be permitted to fall within the confines of the sleeve since this would only defeat the purpose of the sleeve. It has been found in many instances, that it is more convenient to remove cap 19 by severing tubular portion 12 at the required height prior to pouring concrete or the like. In such instances, cap 19 may be inserted either up through the bottom of the tubular portion 11 or pressed downwardly into the tubular portion 12 in an upright or inverted attitude as illustrated in FIGURE 3. In this manner, when the flooring or wall as at 30 has been poured to required height, the upper edge of tubular portion 12 will be flush with the level of the concrete and cap 19 may be removed either by pulling up or by pushing downward. If the cap is left on the tubular portion 12, the buffing machines employed will tend to smash the cap and the appearance of the area surrounding the hole may be impaired. Sleeve 10 may be left in the floor after the concrete has set or may be removed. Unlike metal sleeves, these sleeves of this present application may be left in the floor or wall without fear of discoloration due to rust. Moreover, sleeves such as 10 may be easily removed. When form 20 is removed, the sleeve may be simply pulled out without damage and reused.

While the above invention has been described with reference to several particular embodiments of the invention, it will, of course, be evident that other shapes may be employed without departing from the spirit and scope of the invention.

I claim:

A pipe sleeve comprising: A substantially rigid unitary member including a continuous imperforate wall stepped intermediate its length to define a first tubular portion having a first end and a second end, and a second tubular portion having a first end and a second end, an outwardly extending flange on said first end of said first tubular portion, and an integral end wall extending across said second end of said second portion, said end wall having at least one hole therethrough, said first portion having an internal diameter corresponding to the outer diameter of said second portion, one of said portions having a peripheral groove adjacent one end thereof and the other of said portions having a peripheral rib adjacent one end thereof to matingly engage with a peripheral groove on the other of said portions of a like second sleeve to hold said second sleeve in secure engagement therewith.

References Cited by the Examiner

UNITED STATES PATENTS

| 1,592,548 | 7/1926 | Walker | 285—64 X |
| 2,610,733 | 9/1952 | Balasevich | 285—399 X |
| 2,650,114 | 8/1953 | Epstein | 285—424 |
| 2,728,126 | 12/1955 | Whitlock | 249—186 |

FOREIGN PATENTS 928,911   6/1963   Great Britain.

CARL W. TOMLIN, *Primary Examiner.*

D. W. AROLA, *Assistant Examiner.*